Sept. 15, 1959 G. O. ANDERSON 2,903,808

RECORD FILING DEVICES

Filed Jan. 11, 1956

Inventor:
George O. Anderson
By Gary, Desmond & Parker
Attys.

United States Patent Office 2,903,808 Patented Sept. 15, 1959

2,903,808

RECORD FILING DEVICES

George O. Anderson, Charlottesville, Va., assignor to Acme Visible Records, Inc., Crozet, Va., a corporation of Delaware Application January 11, 1956, Serial No. 558,507

1 Claim. (Cl. 40—158)

This invention relates to visible index record filing devices, and more particularly to means for filing microfilm in a novel, convenient and most readily accessible manner.

Heretofore in order to view a particular page or image it was necessary to take a reel of microfilm and engage it in some spooling device and unwind it to the particular image concerned, and place it in a viewer to see what it is.

It is an object of the present invention to permit one to go directly to the page or image desired without necessity for unwinding a whole reel of film, with the result that one can find and view the desired record in a matter of seconds, where it has heretofore required minutes.

It is a further object of the present invention to provide means for filing microfilm flat and in the form of strips mounted on visible index record holders and thereon directly indexed for quick location and convenient access.

It is a further object to mount microfilm in the form of short, flat strips in a manner whereby the images thereof can be readily previewed by means of a hand magnifying glass.

It is a further object to additionally provide microfilm strips, filed in the foregoing manner, with protective holders which not only provide a ready means for mounting and supporting the strips in flat form on the visible index filing device, but additionally provide a means of portage for the strips to the conventional enlarging viewer in a manner whereby, due to the construction of the protective holder, the film may be directly viewed therein or slid longitudinally therefrom so as to permit insertion in a viewer with minimum handling or touching of the microfilm records themselves.

The foregoing, and other objects and advantages of the present invention, together with its details of construction and arrangement of parts, will become apparent from a consideration of the following specification and accompanying drawings, wherein.

Figure 1:
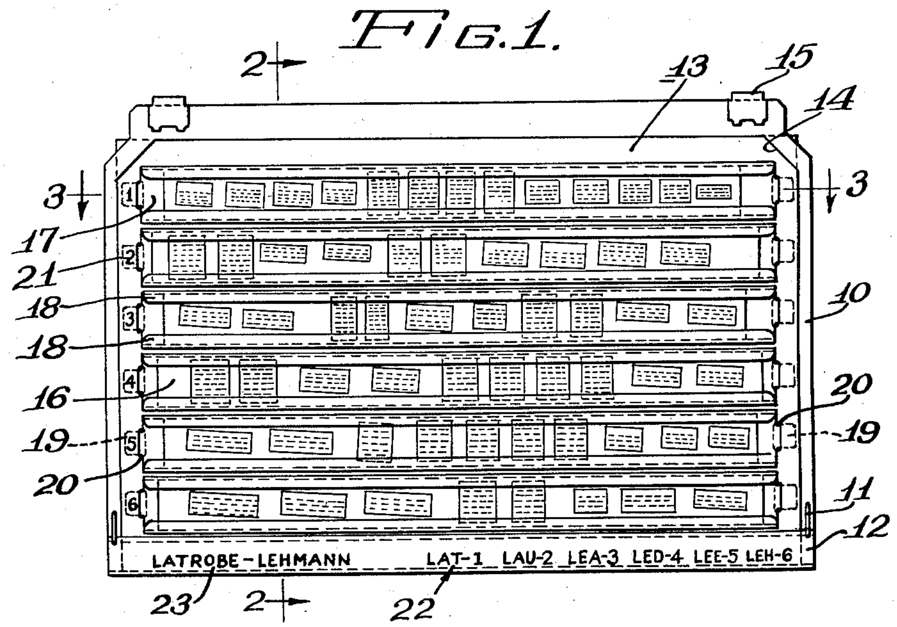
Fig. 1 is a front elevational view of a visible index record holder embodying the present invention.
Figures 2, 3, 4:
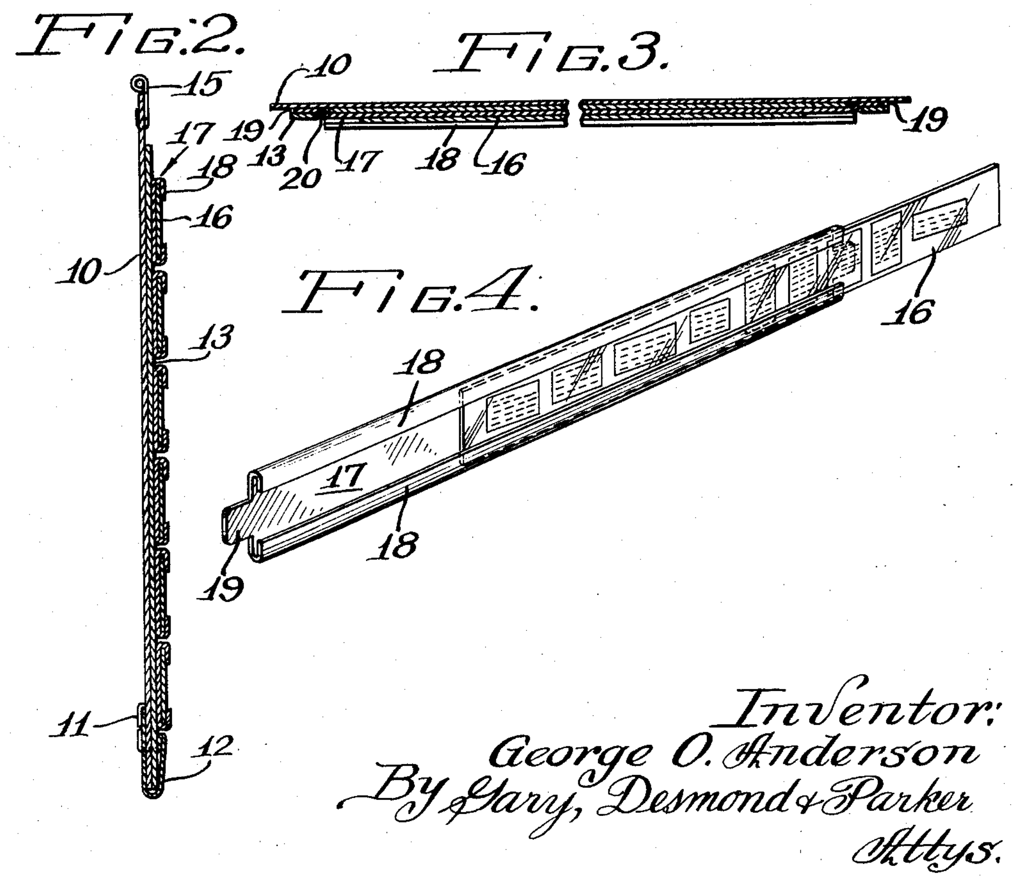
Fig. 2 is an enlarged section on the line 2—2 of Fig. 1.
Fig. 3 is a section on the line 3—3 of Fig. 1.
Fig. 4 is a perspective view of a flat strip of microfilm partially engaged within a supporting holder therefor.

Referring to the drawings, reference numeral 10 designates the back of the assembly which is conventionally in the form of a sheet of flexible fiberboard, to the lower marginal edge of which there is attached, as by means of staples 11, the sheath 12 of transparent, flexible plastic material to form a pocket therewith, This resulting pocket is adapted to receive in conventional manner a record card 13 in supported engagement. Thus, the body 10 is provided with oblique slots 14 for reception of the upper corners of card 13, the card 13 being further engaged by extension of its lower marginal edge within the pocket card, that is, within the confines of the transparent sheath 12. The unit, in conventional manner, is further provided with hinges 15 in engagement with the upper marginal edge of the body 10 for engagement with conventional wire hangers adapted to be endwise disposed beneath opposed flanges of a mounting tray or frame. As will be further understood, the hangers support the units 10 in overlapping relationship to each other and spaced longitudinally of the holder tray or frame, so as to expose the sheath portions of each card holder and to thereby permit the lower marginal edge portion of the supported card 13 to provide visible indexing means for records carried by the assembly, in this case the microfilm strips 16.

From the illustration it will be apparent that the microfilm is employed in the form of relatively short strips in flat form and retained in such position by means of the flat, slotted-face tubes or holders generally designated as 17. These holders 17 are composed of flat strips of flexible, transparent plastic material and having a thickness somewhat greater than that of the film 16 so as to provide rigid support for the latter in flat form, and are provided with a longitudinally extending, opposed pair of inwardly directed flanges 18—18 which are just adequate to snugly support and embrace the opposed longitudinal edges of strip 16. The holder 17 is further formed with the opposed ears 19—19 projecting laterally from its transverse ends, these ears 19 being receivable in opposed slot pairs 20—20 extending transversely of and adjacent to the side edges of a card 13.

As previously indicated, the holder tube 17 is preferably composed of transparent material so that the images on the microfilm strip 16 can be readily viewed and, if desired, projected without removing the film from the protective holder 17. Further, by reason of the slotted nature of the tube 17, a minimum number of thicknesses overlying the strip 16 are present so as to facilitate viewing, and, further, this slotted nature of the tube permits ready edgewise sliding of the strip 16 in either direction by means of an implement such as a stylus, thus minimizing handling or touching of the microfilm records and thereby preserving them.

As a further characterizing feature of the present invention, it will be noted that the contents of the microfilm strip 16 may be readily and quickly identified for access by means of the visible lower marginal index portion of the assembly. Thus, the lower marginal edge of the card 13 may have inscribed thereon, as by typing, reference to the content of the respective strips so that the user can readily determine which of the several strips he desires, thereby minimizing selection to the images which are contained on a single relatively short strip.

For example, each of the respective strips may be given a numeral designation adjacent the holder ends as at 21, said numerical designation being further identified in a visible manner on the lower marginal edge of the card 13 exposed through sheaths 12, with correlating abbreviations of the content of the thus numerically designated individual strip as at 22. The lower marginal edge portion of card 13 visible through sheath 12 may also embody indicia such as an alphabetical arrangement of the first and last images on the entire assembly of Fig. 1 as at 23. Thus, by reference to the visible index of card 13, a desired assembly of a film strip 16 and a protective holder 17 may be withdrawn by disengaging of the ears 19 from the slots 20 in card 13, and either employed for viewing in such assembled manner or separated as previously indicated. On the other hand, by reason of the present arrangement, and particularly when the card 13 is of white so as to provide a contrasting background, any of the component images supported on the pocket 10 may be previewed by a simple hand magnifying glass by reason of the microfilm being arranged and supported in flat manner.

As an example of the large number of images that can be stored or rendered immediately accessible on one card holder 13 having a dimension of 8 by 5 inches are 108 images of, for example, the pages of a telephone book. Conventional trays holding about seventy of these pockets, comprising eighteen trays to a cabinet having a depth of two feet, a width of one foot and a height of two feet, permit, by way of example, the filing of 184,000 book page, letter or the like separate record images which are immediately accessible and usable without the necessity of tedious selection or setting into a viewing device for the selection. It will thus be apparent that the user can find and view the desired record in a matter of seconds which heretofore has taken minutes.

It will be understood that although I have shown the preferred form of my invention, various modifications may be made in the details thereof without departing from its spirit, as comprehended by the following claim.

I claim:

Visible index microfilm filing means comprising a white opaque supporting card, a plurality of spaced parallel strips of transparent microfilm extending transversely of and disposed in plane parallel relationship to and above said card, and separate holder means retaining each of said microfilm strips in separable supported engagement on said card and each composed of an elongated strip of transparent flexible material of relatively greater rigidity than said microfilm strip disposed between the supporting card and film strip and including relatively narrow return-bent longitudinal edge portions providing endwise open slidable engagement retaining flanges above and a relatively wide sight opening for the microfilm strip substantially exposing the images thereon, said film strip holders each further including an opposed pair of laterally projecting ears received within slots formed in said card, the lower marginal card edge embodying indicia correlated to indicia on a vertical edge portion of the card adjacent each of said received ears, said card being adapted for disposition on a pivotally mountable card holder of the class having a transparent sheath embracing the lower marginal edge thereof for reception of the lower marginal edge of said film supporting card.

References Cited in the file of this patent

UNITED STATES PATENTS

| | | |
|---|---|---|
| 1,651,907 | Rand et al. | Dec. 6, 1927 |
| 1,879,041 | Bender | Sept. 27, 1932 |
| 2,544,844 | Liber | Mar. 13, 1951 |
| 2,732,822 | Cassady et al. | Jan. 31, 1956 |

FOREIGN PATENTS

| | | |
|---|---|---|
| 992,728 | France | July 11, 1951 |
| 298,919 | Switzerland | May 31, 1954 |
| 714,468 | Great Britain | Aug. 25, 1954 |